(12) United States Patent
Nelson

(10) Patent No.: US 6,607,627 B2
(45) Date of Patent: Aug. 19, 2003

(54) COMPOUND INJECTION MOLDED HIGH PRESSURE LAMINATE FLOORING

(75) Inventor: Thomas J. Nelson, Belton, TX (US)

(73) Assignee: Premark RWP Holdings, Inc., Wilmington, DE (US)

( * ) Notice: Subject to any disclaimer, the term of this patent is extended or adjusted under 35 U.S.C. 154(b) by 133 days.

(21) Appl. No.: 09/797,972

(22) Filed: Mar. 5, 2001

(65) Prior Publication Data

US 2002/0122919 A1 Sep. 5, 2002

(51) Int. Cl.[7] .................. B29C 45/14; B29C 70/84
(52) U.S. Cl. .............. 156/245; 264/153; 264/162; 264/250; 264/263; 264/277
(58) Field of Search ................ 264/138, 250, 264/254, 275, 266, 271.1, 153, 162, 261, 263, 277, 259; 156/245

(56) References Cited

U.S. PATENT DOCUMENTS

| | | | |
|---|---|---|---|
| 3,223,056 A | 12/1965 | Wilburn | 108/150 |
| 3,608,007 A | 9/1971 | Henrikson | 264/45 |
| 3,907,624 A | 9/1975 | Gravely, Jr. | 156/214 |
| 4,078,959 A | * 3/1978 | Palfey et al. | 156/214 |
| 4,087,948 A | 5/1978 | Mellor | 52/180 |
| 4,160,761 A | 7/1979 | Prusinski et al. | 260/42.47 |
| 4,263,247 A | * 4/1981 | Berger et al. | 264/273 |
| 4,315,967 A | * 2/1982 | Prior et al. | 106/683 |
| 4,318,764 A | 3/1982 | VanManen | 156/244.11 |
| 4,397,798 A | 8/1983 | Parten | 264/46.5 |
| 4,622,191 A | * 11/1986 | Takeuchi | 264/132 |
| 4,625,491 A | * 12/1986 | Gibson | 52/126.6 |
| 4,626,185 A | 12/1986 | Monnet | 425/110 |
| 4,746,560 A | * 5/1988 | Goeden | 156/307.1 |
| 4,832,995 A | * 5/1989 | McLauchlin | 156/269 |
| 4,901,490 A | 2/1990 | Zinniel et al. | 52/263 |
| 4,905,437 A | 3/1990 | Heather | 52/263 |
| 4,916,016 A | 4/1990 | Bristowe et al. | 428/411.1 |
| 4,980,109 A | 12/1990 | Yamamoto et al. | 264/135 |
| 5,130,374 A | 7/1992 | Cozens et al. | 525/239 |
| 5,213,739 A | 5/1993 | Dickerson et al. | 264/135 |
| 5,319,522 A | 6/1994 | Mehta | 361/748 |
| 5,413,661 A | * 5/1995 | Spengler et al. | 100/237 |
| 5,413,748 A | 5/1995 | Garza | 264/135 |
| 5,422,154 A | 6/1995 | Chen | 428/92 |
| 5,449,480 A | 9/1995 | Kuriya et al. | 264/112 |
| 5,682,724 A | 11/1997 | Randjelovic | 52/403.1 |
| 5,741,454 A | * 4/1998 | Polidori | 264/112 |
| 5,876,651 A | 3/1999 | Blackburn, Jr. et al. | 264/265 |
| 5,904,886 A | * 5/1999 | Stecker | 264/139 |
| 5,925,302 A | 7/1999 | Oono et al. | 264/267 |
| 5,989,668 A | * 11/1999 | Nelson et al. | 428/322.2 |
| 5,993,719 A | 11/1999 | Abe et al. | 264/257 |
| 6,025,064 A | 2/2000 | Kawata et al. | 428/304.4 |
| 6,045,738 A | 4/2000 | Atake | 264/266 |
| 6,045,744 A | 4/2000 | Kobayashi et al. | 264/511 |
| 6,117,384 A | 9/2000 | Laurin et al. | 264/297.2 |
| 6,146,564 A | 11/2000 | Beckmann | 264/46.5 |
| 6,150,026 A | * 11/2000 | Furuya et al. | 264/255 |
| 6,168,742 B1 | 1/2001 | Yamamoto | 264/266 |
| 6,174,482 B1 | 1/2001 | Reames et al. | 264/250 |
| 6,187,233 B1 | 2/2001 | Smith | 264/75 |
| 6,207,089 B1 | 3/2001 | Chuang | 264/135 |
| 6,428,738 B1 | * 8/2002 | Winget et al. | 264/138 |

* cited by examiner

*Primary Examiner*—Angela Ortiz
(74) *Attorney, Agent, or Firm*—Welsh & Flaxman LLC

(57) ABSTRACT

The invention relates to a method for fabricating a decorative laminate panel, wherein the decorative laminate panel includes a decorative laminate layer and a core. The method is achieved by forming a decorative laminate of a predetermined size, placing the decorative laminate within a die cavity, injection molding the core within the die cavity while the decorative laminate remains within the die cavity to form a decorative laminate panel and releasing the formed decorative laminate panel from the die cavity. The invention further relates to a decorative laminate panel manufactured in accordance with the method defined above and a unitary edge profile member adapted for use in the fabrication of a compound injection molded decorative laminate panel.

14 Claims, 6 Drawing Sheets

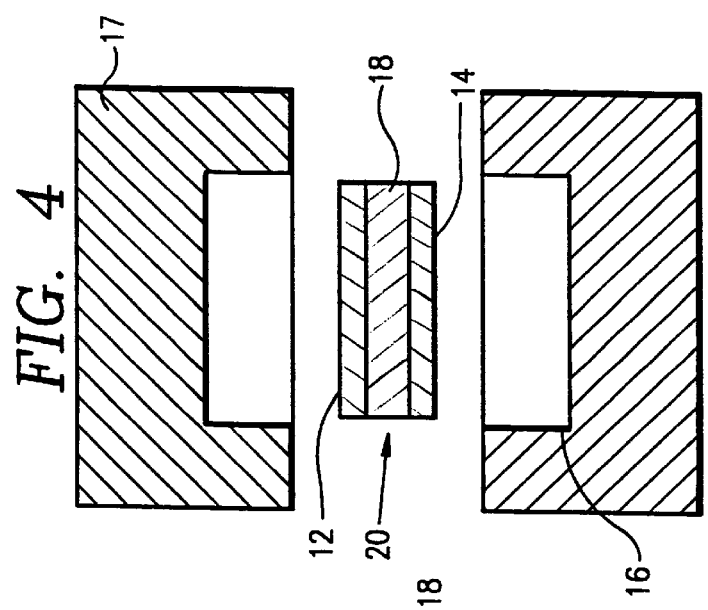
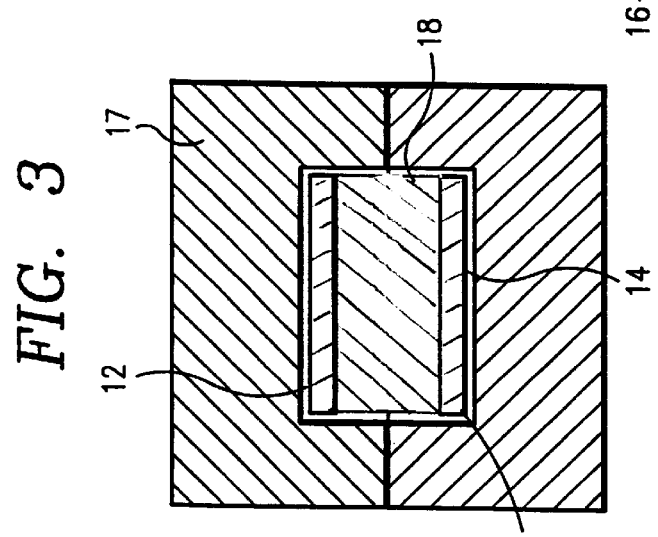
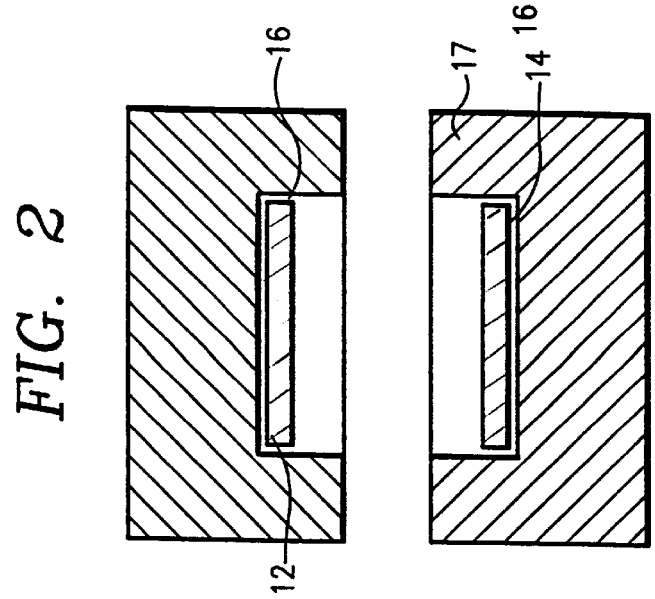

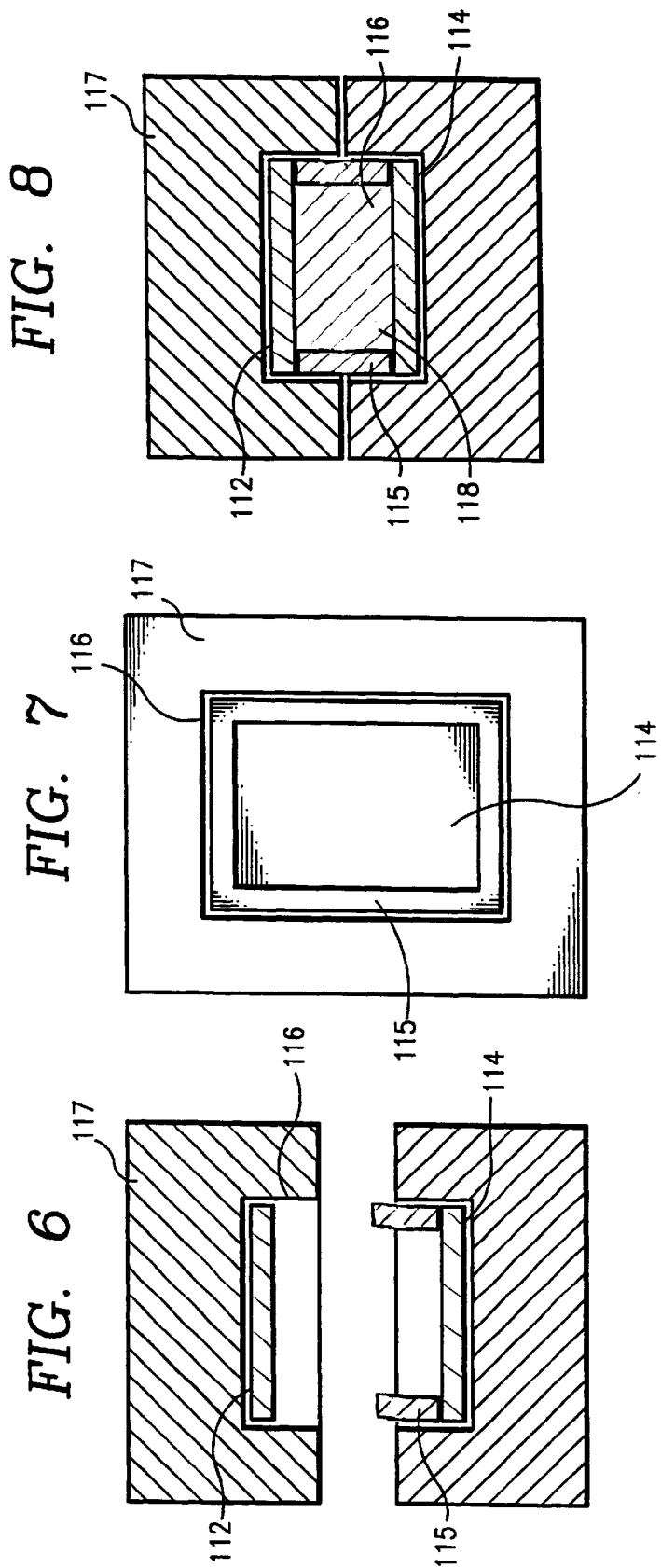

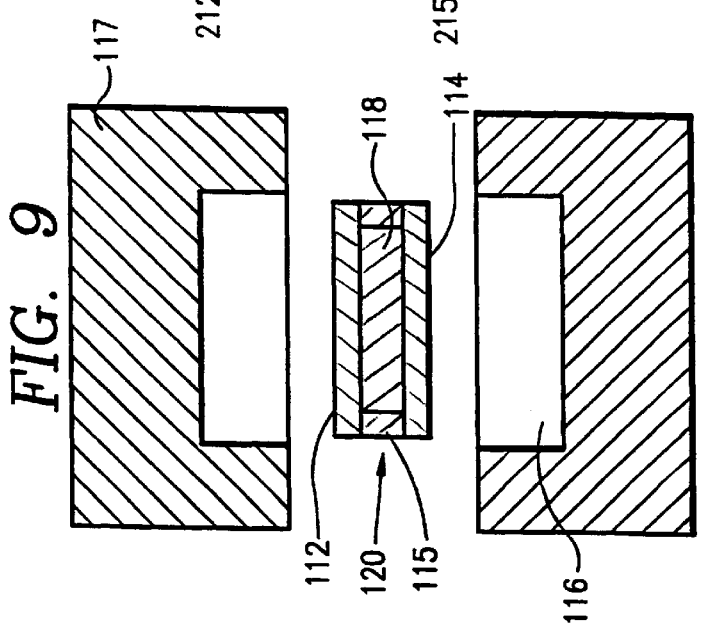
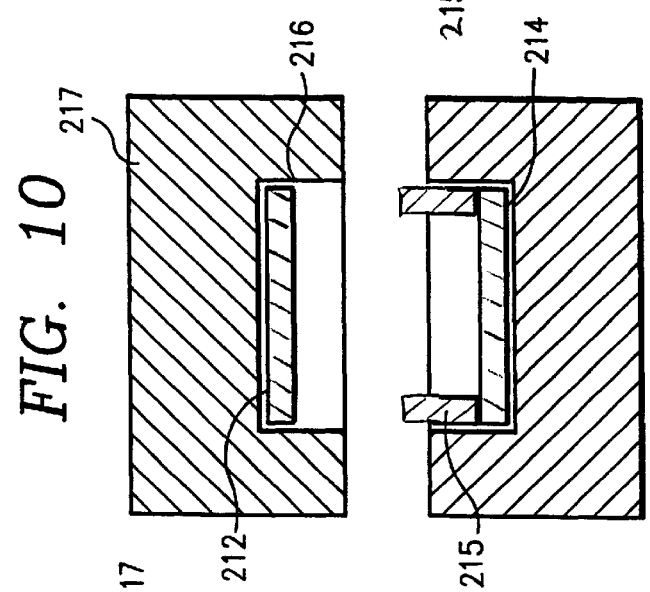
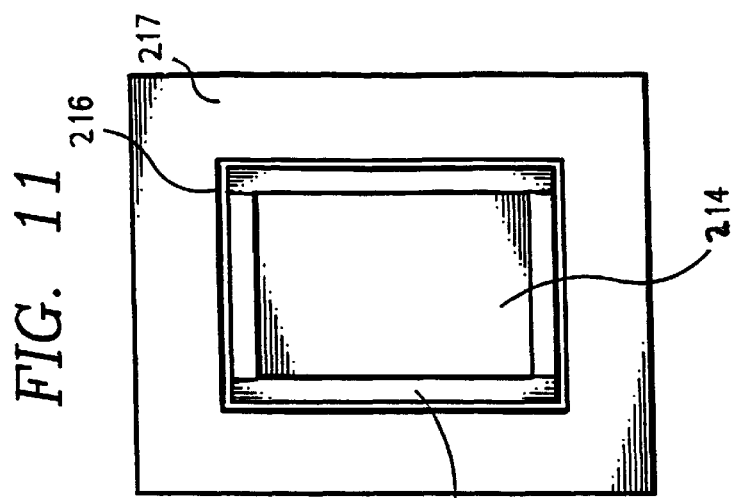

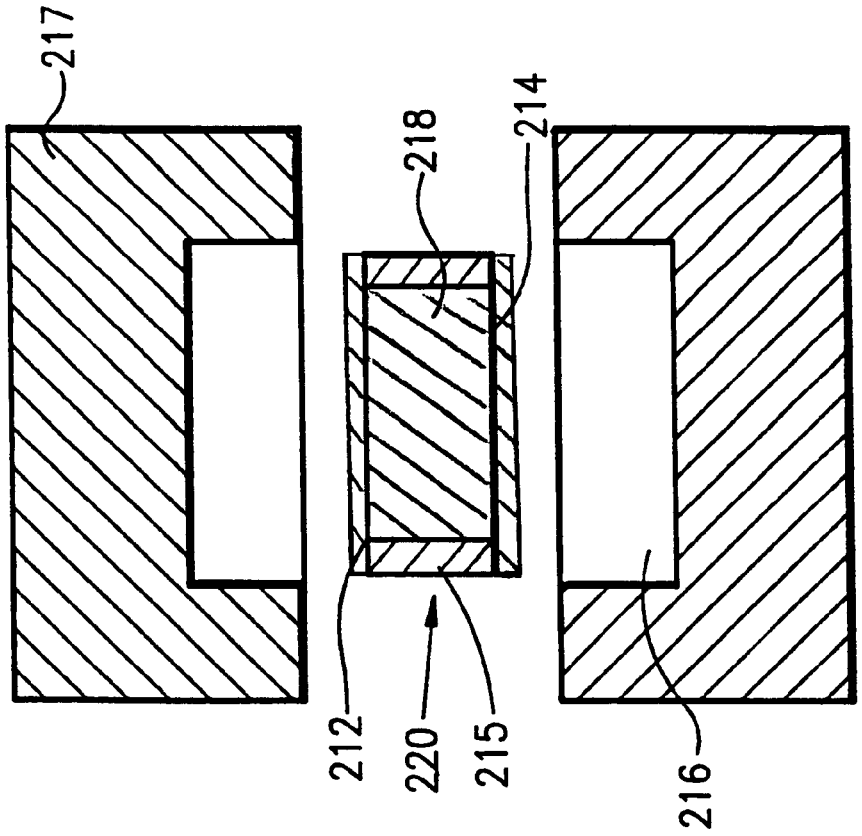

COMPOUND INJECTION MOLDED HIGH PRESSURE LAMINATE FLOORING

BACKGROUND OF THE INVENTION

1. Field of the Invention

The invention relates to a method for the manufacture of decorative laminate panels. More particularly, the invention relates to a method for compound injection molding decorative laminate flooring planks and planks manufactured in accordance with the present method.

2. Description of the Prior Art

Decorative laminate panels, and particularly, decorative laminate flooring planks, are commonly manufactured in a linear manner. That is, the various components move through an extensive processing line where the various components are bound, cut, sized, shaped, boxed and shipped.

The first step in the linear manufacture of decorative laminate flooring is combining the components of the flooring planks. Specifically, the cores, backing layers and decorative panels are continuously fed and assembled into large decorative panels requiring substantial additional processing before the final product is ready for shipping and use. Once a large decorative panel is completed and inspected, it is conveyed to a processing line where it is machined into a predetermined number of flooring planks. Finally, the finished flooring planks are packaged and palletized for shipping.

It should be understood that the process described herein is designed to be continuous. As such, a breakdown occurring at any point in the line results in the shutdown of the entire processing line until such a time that the problem is corrected. The size of the problem is generally irrelevant and the line must be shut down whether a belt is misaligned or the entire control system goes down.

The use of line processing further limits production capabilities, and necessitates a substantial investment in updating or replacing equipment segments within a processing line once the capacity of a given equipment segment reaches its production limit. For example, if a packaging segment in a flooring plank processing line is capable of packaging 36 boxes of 8 planks per hour, the remainder of the line is limited to this capacity regardless of whether other equipment segments are capable of a greater output. The replacement or updating of equipment segments to raise the overall line output may continue until such a time that the size of the processing line exceeds the allotted space. The entire processing line must then be moved to a larger space or replaced with an entirely new line. Manufacturers, therefore, attempt to maximize the production capabilities of an existing line before investing substantial sums of money into the creation of a new processing line.

However, increased speed is not always an answer to the need for increased production. When a processing line is pushed to its limits, it is more likely to break down, resulting in down time. In addition, where a processing line is operating at maximum capacity, for example, 100 flooring planks per minute, errors in processing result in the disposal of all items processed during a given time period. When this occurs, 1,500 planks would necessarily be thrown away where planks were being manufactured in error for a period of only 15 minutes.

In accordance with one known production line, the large decorative panels are formed as approximately 1.22 m×2.44 m sheets. Each sheet is then cut into a predetermined number of flooring planks. The edge detail of each plank is then machined and the planks are packaged for shipping.

Extensive and expensive cutting tools are used in converting these large panels into multiple planks, as well as in machining the required edge profile into the flooring planks. The extensive use of cutting tools adds substantial time and expense to the manufacturing process. For example, the positioning and wear status of the cutting tools is continuously monitored to ensure the highest quality in the resulting flooring planks. In addition, the cutting tools are preferably diamond tipped and maintenance of these diamond tipped cutting tools adds substantial expense to the manufacturing process.

In addition to the cost and maintenance problems associated with the use of conventional cutting tools in the manufacture of flooring planks, the use of cutting tools limits the possible edge profiles that may be formed on the flooring planks. These limitations in turn restrict the possible designs which might be used to improve the functionality, repairability and installability of flooring planks.

Current machining techniques used in forming desired edge profiles require that substantial portions of the core, decorative laminate wear surface and backer laminate be machined away. This generates substantial and undesirable waste.

As mentioned above, conventional flooring planks are manufactured with a decorative laminate wear surface, a backing layer and a core positioned between the wear surface and the backing layer. The use of current manufacturing techniques severely limits possible variations which might improve the structural characteristics of the flooring planks.

For example, the core or substrate materials commonly used in conventional flooring planks are wood-based and, therefore, susceptible to the effects of moisture. Moisture renders wood-based substrates highly susceptible to warping, shrinkage, and separation between the decorative laminate wear surface, backer layer and the core. Since current flooring plank manufacturing techniques have been developed to primarily handle wood-based core materials, their adaptation for manufacturing flooring planks utilizing alternate, waterproof, core materials is thought to be impractical.

In addition to the water damage to which wood-based flooring planks are susceptible, the use of wood-based core materials substantially extends the time required for producing flooring planks. Before a core material may enter the processing line, the core material, for example, medium density fiberboard, must sit in a controlled environment for a period of approximately 24 hours to 72 hours to ensure proper temperature equilibration. Similarly, once the wear surface and backing layer are bonded to the core, and the flooring plank is formed, the finished flooring plank must further sit and equilibrate for an additional 24 hours to 72 hours. This final sitting period allows for the dissipation of stresses from the formed panel.

The extended sitting periods required in the manufacture of decorative laminate flooring planks necessitate that substantial storage space be provided. The extended sitting periods further leave the core materials and finished flooring planks susceptible to damage during the time in which they are required to sit. For example, core sheets are often permanently bent or warped during storage and must be thrown away.

Damage to the formed panels and/or planks is also encountered as a result of the many steps involved in the production thereof. As those skilled in the art will certainly appreciate, the components of the panel are moved many times during production of a flooring plank and each time the panel, or the components thereof, are moved, there is a chance that damage will occur.

The shortcomings of traditional manufacturing processes used in the production of decorative laminate flooring planks highlight the need for a new approach in the manufacture of decorative laminate flooring planks, as well as other decorative laminate products. The present invention provides a new and innovative approach to the manufacture of decorative laminate flooring planks and other related decorative laminate products.

SUMMARY OF THE INVENTION

It is, therefore, an object of the present invention to provide a method for fabricating a decorative laminate panel, wherein the decorative laminate panel includes a decorative laminate layer and a core. The method is achieved by forming a decorative laminate of a predetermined size, placing the decorative laminate within a die cavity, injection molding the core within the die cavity while the decorative laminate remains within the die cavity to form a decorative laminate panel and releasing the formed decorative laminate panel from the die cavity.

It is also an object of the present invention to provide a decorative laminate panel manufactured in accordance with the method defined above.

It is further an object of the present invention to provide a unitary edge profile member adapted for use in the fabrication of a compound injection molded decorative laminate panel. The unitary member defines an enclosed space and is shaped and dimensioned for receipt of an injection molded core. The unitary member further includes a radially outwardly facing wall, the outwardly facing wall including a shaped profile shaped and dimensioned for engagement with the edge profile of an adjacent decorative laminate panel.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 2 is a cross sectional view of an open die receiving a wear surface and backing layer in accordance with the present invention.

FIG. 3 is a cross sectional view of a closed die in which core material has been injected.

FIG. 4 is a cross sectional view of an open die releasing a formed flooring plank in accordance with the present invention.

FIG. 6 is a cross sectional view of an open die receiving a wear surface, backing layer and edge profile member in accordance with the method disclosed in FIG. 5.

FIG. 7 is a top view of the lower die member shown in FIG. 6 with the edge profile member therein.

FIG. 8 is a cross sectional view of a closed die in which core material has been injected in accordance with the method disclosed with reference to FIG. 5.

FIG. 9 is cross sectional view of an open die releasing a formed flooring plank in accordance with the method disclosed in FIG. 5.

FIG. 10 is a cross sectional view of an open die receiving a wear surface, backing layer and edge profile members in accordance with an alternate method.

FIG. 11 is a top view of the lower die member shown in FIG. 10 with the edge profile member thereon.

FIG. 12 is cross sectional view of an open die releasing a formed flooring plank in accordance with the embodiment described with reference to FIG. 10.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
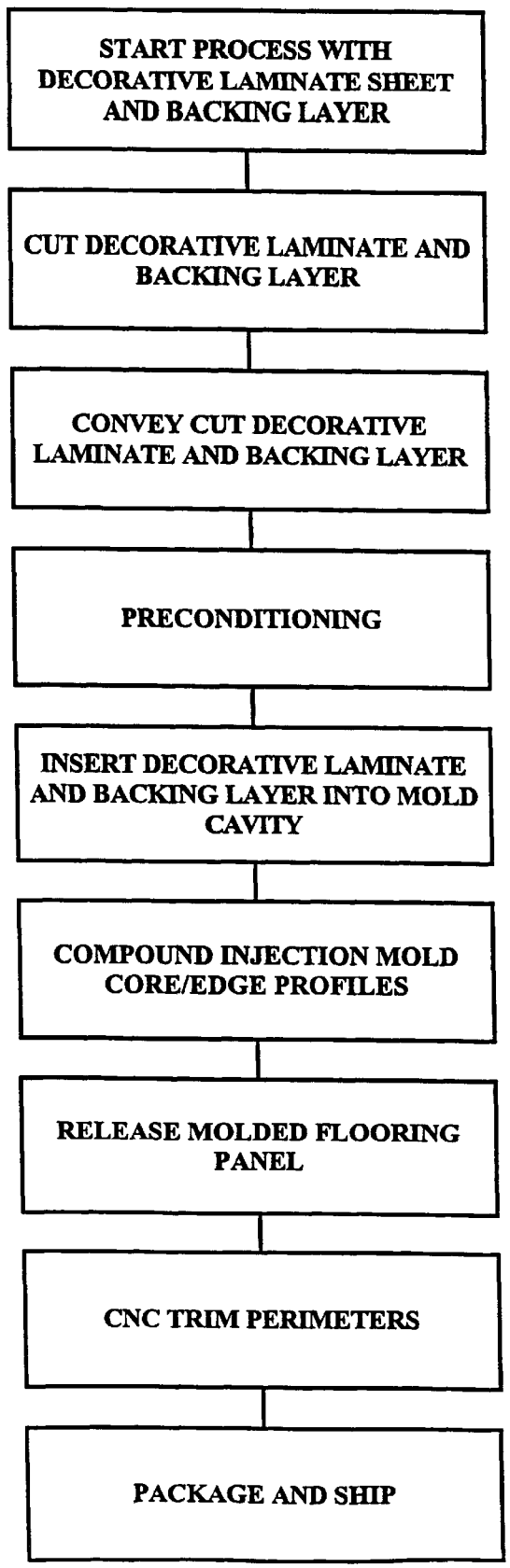
FIG. 1 is a flow chart of the present method for the compound injection molding of decorative laminate planks.
Figure 5:
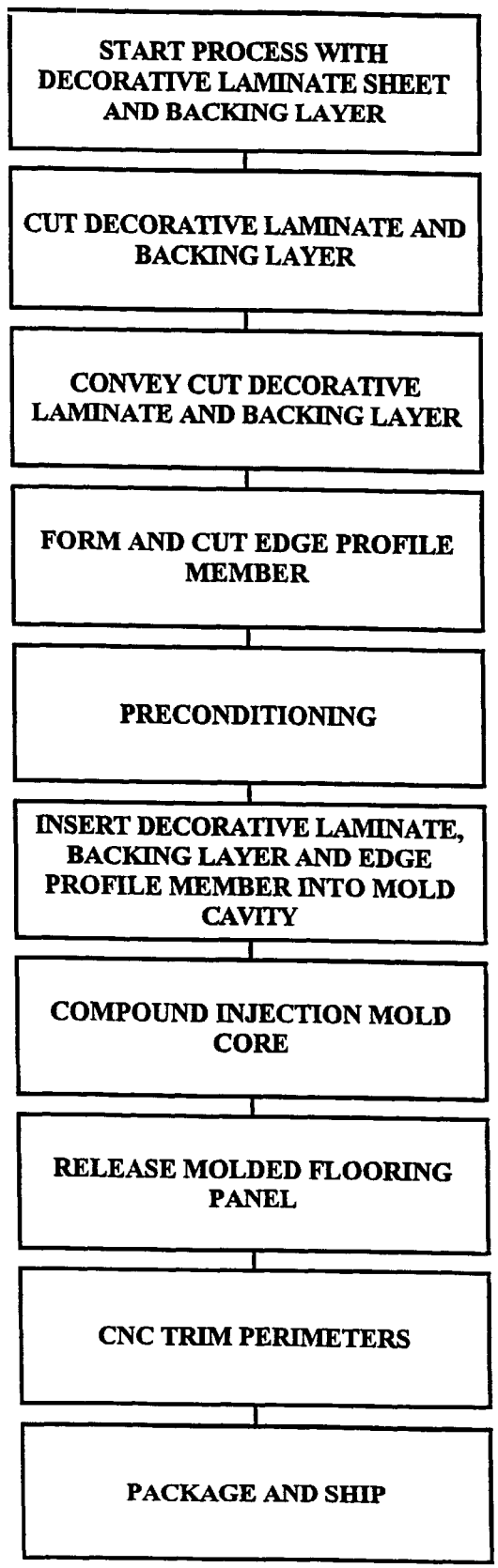
FIG. 5 is a flow chart of an alternate embodiment of the present method which includes the use of an edge profile member.

With reference to FIG. 1, a flow chart of a preferred method in accordance with the present invention is disclosed. The method generally relates to the manufacture of decorative laminate panels, and particularly, the manufacture of decorative laminate flooring planks. The present method provides for the compound injection molding of decorative laminate flooring planks in a piecewise manner. This eliminates the problems associated with conventional line techniques employed in the prior art and discussed above in the "Background of the Invention".

The term "flooring planks" is used throughout the body of the present specification in describing decorative laminate flooring panels, and should not be interpreted as limiting the scope of the invention to flooring panels of any specific shape. In fact, the present invention opens the possibility for the manufacture of flooring plank shapes previously considered cost prohibitive.

As outlined in FIG. 1 and as shown in FIGS. 2, 3 and 4, a decorative laminate wear surface 12 is first produced and cut into appropriate sizes for use in conjunction with the compound injection mold die 17 employed in accordance with the present process. Cutting is achieved using conventional sizing techniques adapted to cut laminate sheets to desired sizes and shapes. Such cutting techniques are well known to those skilled in the art.

In accordance with a preferred embodiment of the present invention, the decorative laminate wear surface 12 is generally cut in either 39.4 cm by 39.4 cm squares or 118.1 cm by 19.7 cm rectangles, as these are commonly used shapes in the fabrication and installation of decorative laminate flooring. As will be better appreciated based upon the foregoing disclosure, the cut sheets of decorative laminate are cut slightly larger than specified above (for example, about 0.381 mm to 0.762 mm) to allow for final processing including the removal of overhang portions from the decorative laminate wear surface 12 for final sizing and squaring of the plank.

Similarly, the backing layer 14 is also produced and cut into appropriate sizes for use in conjunction with the compound injection mold die 17. As with the decorative laminate wear surface 12, cutting is achieved using conventional laminate sizing techniques which may be readily adapted to cut laminate sheets to desired sizes and shapes. The backing layer 14 is cut to a shape substantially matching, but slightly smaller than, that of the decorative laminate wear surface 12. However, the backing layer 14 is hidden from the end user's view and it is not critical that the appearance of the backing layer 14 be maintained at the same high standards as those applied to the decorative laminate wear surface 12.

While preferred shapes and dimensions are disclosed above, the decorative laminate wear surface 12 and backing layer 14 may be cut into a variety of shapes without departing from the spirit of the present invention. In fact, the present invention allows for the production of a wide variety of shaped panels (for example, octagons, triangles, etc.).

In addition, it is contemplated that various cutting techniques known to those skilled in the art may be employed in accordance with the present invention. In fact, the cutting of the decorative laminate wear surfaces 12 and backing layers 14 need not take place immediately before the injection molding steps. The decorative laminate wear surfaces 12 and backing layers 14 may be cut to size and stored under appropriate conditions for later use.

However, it is contemplated that the cutting step and the injection molding step will take place as part of a continuous process with the laminate wear surfaces 12 and backing layers 14 being cut just prior to the preconditioning and formation of the complete laminate flooring planks 20. Such a continuous system is believed to be more cost effective since the necessity for storing precut laminate sheets would add additional expense to the process.

Once formed, the cut decorative laminate wear surfaces 12 and backing layers 14 are preconditioned and conveyed to a die cavity 16 (see FIG. 2). The step of preconditioning allows the cut decorative laminate wear surfaces 12 and backing layers 14 to be physically prepared in order to optimize the bond created between the core 18, the cut decorative laminate wear surface 12 and the backing layer 14.

Briefly, and as will be discussed below in greater detail, when the cut decorative laminate wear surface 12 and backing layer 14 are placed within the die cavity 16, the die 17 is closed and core material is injected within the die cavity 16 to create a panel core 18 (see FIG. 3). The core material is chosen to ensure the formation of a secure bond between the formed core 18, the decorative laminate wear surface 12 and backing layer 14 as the molten core material is shot within the die cavity 16.

In accordance with a preferred embodiment of the present invention and considering the versatility provided by compound molding techniques, it is contemplated that the core may be formed from a wide variety of materials. For example, the core may be formed from filled plastics, unfilled plastics, ceramics, fibers, polymeric foams, and combinations thereof. In practice, it is contemplated that the core materials will be chosen to suit specific requirements associated with the intended use of the flooring planks. For example, it is contemplated that virgin water repellant materials will be used where the planks are likely to be exposed to moisture on a regular basis. However, recycled plastics and plastics including various wood-based products may be used in situations where it is unlikely that the flooring planks will be exposed to moisture.

While contemplated materials are listed above as being exemplary of those materials which may be used in accordance with the present invention, it should be understood that a wide variety of materials may be used without departing from the spirit of the present invention.

After the injection of the core material, the cavity 16 remains closed for a period of time sufficient to allow the flooring plank 20 to set. Finally, the die 17 is opened, the resulting molded flooring plank 20 is released from the die cavity 16, and the flooring plank 20 is moved to a fixture where the flooring plank 20 is precision machined, for example, CNC machined. The finished plank 20 is then conveyed for packaging and transport.

Specifically, the flooring plank 20 is machined to remove edges of the decorative laminate wear surface 12 to ensure that high tolerances are maintained. By machining the edges of the decorative laminate wear surface 12 after the injection molding step, one is able to remove irregularities in the edges of the wear surface 12 which may have occurred prior to molding and square the plank 20 to a higher tolerance than previously possible during the initial cutting steps.

While the flooring planks described above are manufactured with a backing layer, it is contemplated that various core materials may permit the manufacture of flooring planks without the need for the inclusion of a backing layer. Where such panels are formed in accordance with the present invention, the substrate thereof may be formed with structural ribbing designed to add structural stability to the final panel. Structural ribbing may also be included in panels having a backing layer, although it is believed the inclusion of structural ribbing would find more wide spread applications in instances where the backing layer is not formed with the decorative laminate panel.

By compound injection molding the decorative flooring planks in accordance with the present invention, many shortcomings of prior art line processing techniques are overcome. For example, limited tooling is required for injection molding the decorative laminate flooring planks. In addition, virtually the entire line now used to manufacture decorative laminate flooring planks could be replaced by a cutting assembly for the decorative laminate wear surface, a cutting assembly for the backing layer, a preliminary conditioning station for the wear surface and backing layer, a plurality of injection molding dies and final processing machinery; providing a substantial savings in both space and tooling.

The result of such a process is a reduction in the tooling required for the processing of decorative laminate flooring planks and a limited number of stations which might break down. In fact, if the decorative laminate wear surface and the backing layer are cut apart from the injection molding step, only the preconditioning step precedes the injection molding of the decorative laminate flooring planks. In addition, by using multiple injection molding cavities, a shutdown of a single cavity slows down the fabrication process by one machine and does not shut down an entire line as would occur where a machine breaks down in the prior art line processing techniques.

The present compound injection molding process also permits the creation of unique edge profiles, which would be cost prohibitive, or even impossible, using conventional cutting techniques employed in the linear processing of decorative laminate flooring planks. When compound injection molding techniques are employed, the edge profiles which may be created are only limited by the creativity of those designing the flooring planks. For example, interlocking planks such as those disclosed in U.S. Pat. No. 5,618, 602, entitled "Articles with Tongue and Groove Joint and Method of Making Such a Joint", would be easily manufactured in accordance with the present invention.

Similarly, where prior flooring planks commonly include a flat backing surface, the use of compound injection molding in the manufacture of decorative laminate flooring planks would readily permit the manufacture of flooring planks exhibiting a variety of shapes and textures enhancing the functionality of the decorative laminate flooring planks.

An alternate embodiment of the present invention is disclosed in FIGS. 5 to 9. This embodiment takes advantage of a separate edge profile member 115 to enhance the water repellence of the flooring planks 120 and expand upon the possible edge profiles which may be employed in accordance with the present invention. The edge profile member 115 defines a "window frame" positioned between the decorative laminate wear surface 112 and the backing layer 114. The edge profile member 115 further provides an outer edge on the final decorative laminate flooring plank 120 shaped and dimensioned for permitting ready attachment to adjacent flooring planks 120.

Specifically, and as with the embodiment disclosed in FIGS. 1 to 4, the decorative laminate wear surface 112 is first produced and then cut into appropriate sizes for use in conjunction with the compound injection mold dies 117 employed in accordance with the present process. The decorative laminate wear surface 112 is generally cut in either 39.4 cm by 39.4 cm squares or 118.1 cm by 19.7 cm rectangles. As will be better appreciated based upon the foregoing disclosure, the cut sheets of decorative laminate are slightly larger (for example, about 0.381 mm to 0.762 mm) to allow for final processing which may remove edge portions of the decorative laminate wear surface 112.

Similarly, the backing layer 114 is also produced and cut into appropriate sizes for use in conjunction with the compound injection mold dies 117 employed in accordance with the present process. As with the decorative laminate wear surface 112, cutting is achieved using conventional laminate sizing techniques which may be readily adapted to cut laminate sheets to desired sizes and shapes. The backing layer 114 is cut to a shape substantially matching, but slightly smaller than, that of the decorative laminate wear surface 112.

While the backing layer 114 and decorative laminate wear surface 112 are being produced and cut into appropriate sizes, the edge profile member 115 is also produced. The edge profile member 115 is preferably injection molded with a desired edge profile and inner surface. The edge profile member may then be machined to remove any undesired markings remaining after the injection molding thereof.

The edge profile member 115 is preferably injection molded from water repellant thermoplastic materials, including, but not limited to, vinyls, polyolefins, styrenics, polyamides, polyimides, polyethers, polyesters, acrylics, acetals, thermoplastic olefins, thermoplastic urethanes and thermoplastic elastomers. In addition, it is also envisioned that the edge member may be formed from thermoset materials, such as, epoxies, polyurethanes, phenolics, melamines, etc. It is further contemplated that the edge member may be a foamed thermoplastic. More specifically, the edge profile member 115 is preferably formed from acrylic-butadiene-styrene (ABS), although other materials may be used without departing from the spirit of the present invention. As those skilled in the art of injection molding will understand, the edge profile member should be formed from a material having a higher melting temperature than that of the core material. This allows for injection molding of the core without adversely affecting the previously formed edge profile member 115.

As those skilled in the art will certainly appreciate, an almost infinite variety of edge profiles may be applied to the edge profile member 115 through the use of injection molding. In addition, injection molding of the edge profile member 115 provides highly reproducible results ensuring consistent fitting of flooring planks 120 manufactured in accordance with the present invention.

While the edge profile member is injection molded in accordance with a preferred embodiment of the present invention, it is contemplated that the edge profile member may be extruded as multiple pieces (see disclosure below), or otherwise produced, without departing from the spirit of the present invention.

Referring to FIGS. 6, 7, 8 and 9, once formed the cut decorative laminate wear surfaces 112, backing layers 114 and edge profile members 115 are preconditioned and conveyed to a die cavity 116. The step of preconditioning allows the cut decorative laminate wear surfaces 112, backing layers 114 and edge profile members 115 to be physically prepared in order to optimize the bond created between the core 118, the cut decorative laminate wear surface 112, the backing layer 114 and edge profile member 115.

The cut decorative laminate wear surfaces 112, backing layers 114 and edge profile members 115 are then positioned one at a time for processing within the die cavity 116 of the die 117. Briefly, and as will be discussed below in greater detail, when the cut decorative laminate wear surface 112, backing layer 114 and edge profile member 115 are placed within the die cavity 116, the die 117 is closed and core material is injected within the die cavity 116 to create a panel core 118. The core material is chosen to ensure the formation of a secure bond between the formed core 118 and the decorative laminate wear surface 112, the backing layer 114 and the edge profile member 115 as the molten core material is shot within the die cavity 116.

As discussed above, it is contemplated that the core 118 may be formed from a wide variety of materials. For example, the core may be formed from filled plastics, unfilled plastics, ceramics, fibers, polymeric foams, and combinations thereof. In practice, it is contemplated that the core materials will be chosen to suit specific requirements associated with the intended use of the flooring planks. However, and in contrast to the embodiment discussed above with reference to FIGS. 1 to 4, the core material need not be waterproof as the edge profile member 115 will substantially protect the core 118 from water penetration entering from the sides of the formed flooring planks 120. This permits the use of recycled materials which provide desired structural rigidity but which do not offer desired compositional characteristics (or for which the compositional characteristics have not been determined).

While contemplated materials are listed above as being exemplary of those materials which may be used in accordance with the present invention, it should be understood that a wide variety of materials may be used without departing from the spirit of the present invention.

As mentioned above, the edge profile member 115 is positioned within the die cavity 116 to define the edges of the resulting flooring plank 120 and to seal the edges of the injected core 118. The edge profile member 115 is, therefore, considered to form a "picture frame" about the edge of the resulting flooring plank 120.

After the injection of the core material, the die 117 remains closed for a period of time sufficient to allow the flooring panel 120 to set. Finally, the die 117 is opened, the resulting molded flooring plank 120 is released from the die cavity 116, and the flooring plank 120 is moved to a fixture where the flooring plank is precision machined, for example, CNC machined. The finished plank 120 is then conveyed for packaging and transport. Specifically, the flooring plank 120 is primarily machined to remove overhang of the decorative laminate wear surface 112 so as to ensure high tolerances are maintained.

As with the embodiment discussed above with regard to FIGS. 1 to 4, the flooring planks 120 described in accordance with the disclosed embodiment are manufactured with a backing layer. However, it is contemplated that various core materials may permit the manufacture of flooring planks without the need for the inclusion of a backing layer.

As mentioned above with regard to the embodiment disclosed in FIGS. 5 to 9, and with reference to FIGS. 10 to 12, the frame defining the edge of the flooring plank may be composed of multiple edge profile members assembled to form a frame. Specifically, these edge profile members 215 are produced while the backing layer 214 and decorative laminate wear surface 212 are being produced and cut into appropriate sizes.

The edge profile members 215 are preferably injection molded with a desired edge profile and subsequently cut (if necessary) to length for use in the molding step. The edge profile members 215 are preferably injection molded from water repellant plastics as listed above. While the edge profile members are injection molded in accordance with a preferred embodiment of the present invention, it is contemplated that the edge profile members may be extruded, or otherwise produced, without departing from the spirit of the present invention.

The cut decorative laminate wear surfaces 212, backing layers 214 and edge profile members 215 are then assembled and molded in the manner discussed above with reference to FIGS. 6, 7, 8 and 9. The only difference being that the edge profile members 215 must be individually positioned about the circumference of the cavity 216, as opposed to the single piece edge profile member 115 employed in accordance with the embodiment previously discussed.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A method for fabricating a substantially planar, decorative laminate flooring panel, wherein the decorative laminate flooring panel includes a decorative laminate layer composed of a decorative laminate wear surface, a core, and an edge profile shaped and dimensioned for interlocking engagement with other flooring panels, the method comprising the following steps:

forming a decorative laminate wear surface of a predetermined size;

placing the decorative laminate wear surface within a die cavity; the die cavity being shaped and dimensioned for creating an interlocking edge profile along the outer periphery of the resulting flooring panel;

injection molding the core within the die cavity while the decorative laminate wear surface remains within the die cavity to form a decorative laminate flooring panel including a decorative laminate wear surface, a core, and an edge profile shaped and dimensioned for interlocking engagement with other flooring panels; and releasing the formed decorative laminate flooring panel from the die cavity.

2. The method according to claim 1, wherein the core is composed of a material chosen from the group consisting of filled plastics, unfilled plastics, ceramics, fibers, polymeric foams, and combinations thereof.

3. The method according to claim 1, wherein the step of forming includes cutting a decorative laminate sheet to a predetermined size to form a cut decorative laminate wear surface.

4. The method according to claim 1, wherein the decorative laminate flooring panel includes a backing layer, and the method includes the further step of placing the backing layer within the die cavity.

5. The method according to claim 4, including the step of forming at least one edge profile member and placing the at least one edge profile member between the decorative laminate wear layer and the backing layer within the die cavity for use in the formation of the decorative laminate flooring panel.

6. The method according to claim 5, wherein the edge profile member is formed from a material chosen from the group consisting of vinyls, polyolefins, styrenics, polyamides, polyimides, polyethers, polyesters, acrylics, acetals, thermoplastic olefins, thermoplastic urethanes, thermoplastic elastomers, epoxies, polyurethanes, phenolics and melamines.

7. The method according to claim 6, wherein the edge profile member is formed from acrylic-butadiene-styrene.

8. The method according to claim 5, wherein the step of forming the edge profile member includes injection molding the edge profile member.

9. The method according to claim 4, wherein the backing layer is formed by the additional step of cutting a decorative backing layer to a predetermined size to form a cut backing layer.

10. The method according to claim 1, wherein the decorative laminate flooring panel includes a backing layer, and the method includes the further step of placing the backing layer within the die cavity.

11. The method according to claim 10, wherein the edge profile member is formed from a material chosen from the group consisting of vinyls, polyolefins, styrenics, polyamides, polyimides, polyethers, polyesters, acrylics, acetals, thermoplastic olefins, thermoplastic urethanes, thermoplastic elastomers, epoxies, polyethanes, phenolics and melamines.

12. The method according to claim 11, wherein the edge profile member is formed from acrylic-butadiene-styrene.

13. The method according to claim 10, wherein the step of forming the edge profile member includes injection molding the edge profile member.

14. The method according to claim 10, wherein the step of placing includes positioning the edge profile member beneath the decorative laminate wear layer such that it defines an outer edge of the formed decorative laminate flooring panel.

* * * * *